(12) United States Patent
Olsen et al.

(10) Patent No.: US 8,887,512 B2
(45) Date of Patent: Nov. 18, 2014

(54) COOLER FOR TEMPERATURE SENSITIVE ITEMS

(76) Inventors: Richard Elliot Olsen, Salt Lake City, UT (US); Steven Jay Hansen, Round Rock, TX (US)

( * ) Notice: Subject to any disclaimer, the term of this patent is extended or adjusted under 35 U.S.C. 154(b) by 96 days.

(21) Appl. No.: 13/490,211

(22) Filed: Jun. 6, 2012

(65) Prior Publication Data

US 2012/0312031 A1    Dec. 13, 2012

Related U.S. Application Data

(60) Provisional application No. 61/520,231, filed on Jun. 8, 2011.

(51) Int. Cl.

| | | |
|---|---|---|
| *F25B 21/02* | (2006.01) | |
| *A47J 41/00* | (2006.01) | |
| *A47J 41/02* | (2006.01) | |
| *F25D 16/00* | (2006.01) | |

(52) U.S. Cl.
CPC ............... *F25B 21/02* (2013.01); *A47J 41/005* (2013.01); *A47J 41/02* (2013.01); *F25D 2700/12* (2013.01); *A47J 41/0044* (2013.01); *F25D 2331/804* (2013.01); *F25D 16/00* (2013.01)
USPC .............................. 62/3.62; 62/455; 62/457.2

(58) Field of Classification Search
CPC ............ F25B 21/00; F25B 21/04; F25D 3/00; F25D 17/06
USPC .................. 62/3.2, 3.62, 455, 457.2, 207, 62; 220/592.27
See application file for complete search history.

(56) References Cited

U.S. PATENT DOCUMENTS

| | | | | |
|---|---|---|---|---|
| 3,733,836 | A | * | 5/1973 | Corini ............................. 62/3.61 |
| 3,885,403 | A | | 5/1975 | Spencer |
| 5,042,258 | A | * | 8/1991 | Sundhar ........................... 62/3.2 |
| 5,522,216 | A | * | 6/1996 | Park et al. ........................ 62/3.6 |
| 5,572,872 | A | * | 11/1996 | Hlavacek ........................ 62/3.6 |
| 5,704,223 | A | | 1/1998 | MacPherson |
| 5,842,353 | A | * | 12/1998 | Kuo-Liang ...................... 62/190 |
| 6,003,318 | A | | 12/1999 | Busick |
| 6,141,969 | A | * | 11/2000 | Launchbury et al. ............ 62/3.2 |
| 6,260,360 | B1 | * | 7/2001 | Wheeler .......................... 62/3.6 |
| 6,280,781 | B1 | * | 8/2001 | Lande ............................. 426/34 |

(Continued)

FOREIGN PATENT DOCUMENTS

| | | |
|---|---|---|
| FR | 2938901 A1 | 5/2010 |
| JP | 2004212029 | 7/2004 |
| WO | WO9707369 A1 | 2/1997 |

*Primary Examiner* — Mohammad M Ali
(74) *Attorney, Agent, or Firm* — James L. Neal

(57) ABSTRACT

A carrier for thermally sensitive items such as medications, biological tissue and the like comprises a cooling chamber for receiving items to be cooled and a thermoelectric heat transfer module using the Peltier effect to cool the chamber. To maximize the time the cooling chamber remains in a cooled state when the heat transfer module is deenergized, a polymer gel is confined in conductive heat transfer relationship with the cooling chamber wall to provide a "volume of cold" surrounding the cooling chamber. The polymer gel releases thermal energy to the cooling chamber as the chamber is cooled to attain essentially the same temperature as the cooling chamber and absorbs thermal energy from the cooling chamber when the heat transfer module is deenergized and the cooling chamber begins to warm. Absent active cooling this release and absorption of thermal energy maximizes the duration of cold temperatures in the cooling chamber.

5 Claims, 3 Drawing Sheets

(56) References Cited

U.S. PATENT DOCUMENTS

| | | |
|---|---|---|
| 6,401,461 B1 | 6/2002 | Harrison |
| 6,422,024 B1 * | 7/2002 | Foye ................................ 62/3.2 |
| 6,519,948 B2 * | 2/2003 | Zorn ................................ 62/3.6 |
| 6,530,232 B1 * | 3/2003 | Kitchens .......................... 62/3.3 |
| 6,574,967 B1 | 6/2003 | Park |
| 6,591,615 B1 * | 7/2003 | Luo ................................ 62/3.7 |
| 6,666,032 B1 * | 12/2003 | Rickson et al. .................. 62/3.6 |
| 6,674,052 B1 * | 1/2004 | Luo ................................ 219/520 |
| 6,732,533 B1 | 5/2004 | Giles |
| 6,895,762 B1 * | 5/2005 | Lin ................................. 62/3.3 |
| 6,968,888 B2 * | 11/2005 | Kolowich ....................... 165/10 |
| 7,210,298 B2 * | 5/2007 | Lin ................................. 62/3.63 |
| 7,287,386 B2 * | 10/2007 | Upadhye et al. ................. 62/3.3 |
| 2002/0162339 A1 | 11/2002 | Harrison |
| 2003/0115902 A1 | 6/2003 | Busick |
| 2009/0049845 A1 * | 2/2009 | McStravick et al. ........... 62/3.62 |

* cited by examiner

COOLER FOR TEMPERATURE SENSITIVE ITEMS

PRIORITY CLAIM

This application claims priority from commonly owned U.S. Provisional Application Ser. No. 61/520,231, filed Jun. 8, 2011, the disclosure of which is hereby incorporated by reference.

BACKGROUND OF THE INVENTION

This invention relates to improvements in cooling systems and devices. Particularly, the invention relates to portable coolers useful for storing and transporting temperature sensitive items such as medicines, biological tissues and other perishables.

Some temperature sensitive medications require frequent administration and must be transported with the patient when traveling. Some of these, such as certain biologically based medications, in addition to being temperature sensitive are extremely costly. Activities, including travel, can be restricted by the need to medicate. Travel restrictions relate to the duration of travel and to conditions. Leaving some medications in a car during hot weather, even for short periods, may not be possible without degrading the safety, quality or effectiveness of the medication. On long trips medications are subjected to vagaries of travel that can make maintenance of specific temperature conditions doubtful.

Patients have resorted to transporting medications in small beverage containers, in ice or with various cold packs. Insulated water and beverage carriers are commandeered for medications on occasion. These provide a measure of cool storage but not the longevity, degree of cooling or convenience frequently needed. In all these cases the duration of safe storage is limited by the insulating character of the carrier, the amount of cold packing material and the temperature maintenance requirements of a particular medication.

Portable beverage and water coolers have been provided with cooling systems, such as thermoelectric heat transfer modules, that extend cooling times but these operate only when a power source is available. In some circumstances power sources are unavailable, inconvenient or prohibited.

Examples of coolers of the types mentioned above are described in U.S. Pat. No. 6,003,318, U.S. Patent Pub. No. US2003/0115902 A1 and U.S. Patent Pub. No. US2009/0049845 A1.

Examples of temperature sensitive medications are insulin and Enbrel®. Insulin, for example, is administered at scheduled times and for many patients also must be more or less continuously available for unscheduled administration. A convenient mode of administering drugs is by a drug administering pen. The pen contains an amount of injectable drug sufficient for one or several doses and delivers a measured dose of medication with each administration. A traveler would need to carry several pens to have a quantity of medication sufficient for a long trip. In such a case medication must be stored and transported for an extended time, frequently including periods without power for operating a cooling system.

SUMMARY OF THE INVENTION

An object of this invention is to provide a device incorporating a storage chamber, vessel or receptacle that is maintained at a preset temperature or within a predetermined temperature range. For example, a portable carrier may comprise a receptacle in which temperature is to be controlled. The exterior surface of the receptacle wall, or a substantial portion of it, is surrounded or covered by a material having a volumetric heat capacity effective to store thermal energy or release it as the material experiences temperature changes. The surrounding material is characterized by a thermal mass effective to thermally influence the receptacle over a substantial period of time and thermally engages the receptacle wall to establish a conductive heat transfer relationship with the wall. When the storage receptacle and the surrounding material are at the desired temperature level or within the desired temperature range the surrounding material acts to moderate temperature fluctuations within the receptacle and tends to maintain temperature at the level or within the range. To induce temperature change within the receptacle and its surrounding material, a thermoelectric heat transfer module (i.e.: a Peltier effect module) is provided in thermal engagement with an exterior surface portion of the receptacle. Thermoelectric heat transfer modules are thermodynamically reversible. The device functions as a cooler if the module is operated so that the side in thermal communication with the storage receptacle is the cold side. If the module is operated so that the side in thermal communication with the storage receptacle is the hot side the device operates as a warmer or heater. The receptacle and the surrounding material are both thermally insulated from ambient conditions.

For purposes of this Specification the term volumetric heat capacity refers to the ability of a given volume of a substance to store thermal energy while undergoing a given temperature change. Thermal mass describes the characteristic by which the substance provides "inertia" against temperature change.

Another object of this invention is to provide a portable thermoelectric cooler having a cooling chamber configured to receive thermally sensitive materials such as medicines, pens containing medications for injection in measured doses, biological tissues and other perishables in which the time period is maximized during which a desired temperature range in the cooling chamber is maintained without active cooling. The temperature of the cooling chamber is reduced by a thermoelectric heat transfer module using the Peltier effect to establish a temperature state which the thermally sensitive items can tolerate and at which they will be preserved. The thermoelectric heat transfer module has its cold side in thermally conductive relationship with a wall of the cooling chamber for establishing thermal energy transfer between said module and said receptacle. A compartment surrounds or substantially surrounds the cooling chamber for holding a material characterized by a thermal mass effective to enable the material to release and store thermal energy with temperature changes. For example, the material may be a polymer gel confined in thermal engagement with the outer wall surface of said cooling chamber. The polymer gel has a high cold retention capacity as compared to some other materials commonly used such as ice or dry ice. The polymer gel thermally engages and substantially surrounds the wall of the cooling chamber to extend the time the cooling chamber, once cooled, remains cool without active cooling by the module. The receptacle and the polymer gel are both thermally insulated from ambient conditions by a surrounding vacuum chamber or other insulation such as urethane foam insulation.

More specifically, the device of this invention may include a cooling or cold chamber with an elongated tubular side wall, a planar bottom surface and an insulated closure fitted to the end of the cooling chamber opposite the bottom. A thermoelectric heat transfer module cools the cold chamber and a material surrounding the cold chamber. As is characteristic of such modules it has a heat absorptive cold side and an opposing heat emissive hot side. The cold side of the module is in thermally conductive communication with the bottom surface of the cold chamber and the hot side is in thermally conductive communication with a heat sink. The cold side of the module may be spaced from the bottom surface of the cold chamber by a thermal conductor, an aluminum block for example. This forms a space for thermal insulation between the module and the bottom of the chamber. The heat sink dissipates heat energy extracted from the cold chamber. A fan cools the heat sink.

The material surrounding the cold chamber may be a polymer gel having a volumetric heat capacity that enables it to release a significant quantity of thermal energy to its surroundings, the energy released depending on temperature differences. The gel, sealed within a second chamber, is confined in conductive thermal energy transfer relationship with all or a substantial portion of the cold chamber side wall. The volumetric heat capacity of the gel is such that the gel provides an effective "volume of cold" in thermal energy transfer relationship with the cold chamber. The cold chamber and the gel are thermally insulated from ambient conditions by a surrounding vacuum chamber that forms an insulated enclosure.

A thermally sensitive detector senses temperature within the insulated enclosure. That is, the detector senses either or both the cold chamber temperature and the gel chamber temperature. The detector provides a signal indicative of the sensed temperature to a microprocessor. The microprocessor controls operation of the thermoelectric heat transfer module and the cooling fan in response to signals from the detector to achieve and maintain a target temperature or a temperature within a target range. (When the term "target temperature" is used herein it should be understood to refer to either a specific temperature or a temperature within a specific range.) The gel moderates temperature fluctuations in the cold chamber. When an electrical energy source is not available or when the system is turned off for any reason the volumetric heat capacity of the gel is such that the gel maintains the target temperature in the cold chamber for an interval of time exceeding the time the temperature would be maintained absent the presence of the gel. In this manner the gel material assists the vacuum chamber in maintaining the temperature in the cold chamber within a desired range.

When the device is at or near the target temperature and a power source for the thermoelectric heat transfer module and the fan is unavailable or turned off, the "cold" gel, or other material characterized by the required thermal mass, extends the period in which the target temperature is maintained in the cooled storage chamber. The heat capacity or thermal capacitance of the material is expressed by the equation:

$$Cth = \frac{Q}{\Delta T}$$

Where Cth is the thermal heat capacity of the material, Q is thermal energy transferred and $\Delta T$ is the change in temperature. From the above expression is apparent that the temperature change ($\Delta T$) resulting from a given thermal energy input (Q) will decrease as the heat capacity (Cth) increases. That is:

$$\Delta T = \frac{Q}{Cth}$$

The ability of the cold chamber to experience minimal temperature rise while experiencing thermal energy input is a function of the heat capacity of the particular material surrounding the cold chamber and the volume of the material or, stated differently, it is a function of the magnitude of the thermal mass associated with the material installed in thermal energy transfer relationship with the cold chamber. Correspondingly, the duration of the time interval during which the cold chamber remains within the target temperature range without active cooling is increased by the material surrounding the cold chamber and the increase is a function of the volumetric heat capacity of the material. That is, the greater the heat capacity of the material surrounding the cold chamber and the greater its volume the longer the cold chamber will remain within the target temperature range without active cooling, other factors being the same.

The volume of gel contained in the gel chamber is one for which the volumetric heat capacity is effective to maintain the cooling chamber within a predetermined temperature range for a predetermined period of time. For example, the volume of a gel used may be such as to maintain the chamber when cooled at 2° C. for a time, or to sustain temperatures within the range 2° C. to 8° C. for a period of time, without active cooling by the thermoelectric heat transfer module. A greater volume of gel, all else being equal, will provide a longer cool period within the temperature range. Correspondingly, a smaller volume of gel will provide a shorter cool period.

The method employed for cooling a chamber adapted to contain thermally sensitive items such as medications, pens containing several doses of medication for measured administration, biological tissue or other thermally sensitive materials will be understood from the description below.

The chamber wall or a substantial portion of the chamber wall is covered by and in conductive thermal energy transfer relationship with a polymer gel or other material having an acceptable heat capacity. A thermoelectric heat transfer module situated with its cold side in thermal communication with the wall of the chamber is energized to cool the chamber to a predetermined temperature, for example 2° C., or to maintain the temperature within a predetermined range, for example 2° C. to 8° C. A microprocessor controls the cooling function of the module to maintain the target chamber temperature in response to chamber temperature related signals from a thermistor or other thermal sensor. The chamber is maintained above freezing temperature because some thermally sensitive materials will be damaged by freezing as well as by temperatures above their tolerance level.

The polymer gel, being in conductive thermal energy transfer relationship with the walls of the chamber, is cooled by transfer of heat from the gel to the chamber as the chamber is cooled by operation of the module. Optimally, the module operates to cool the chamber so as to maintain the chamber and the gel in thermal equilibrium at the predetermined temperature or temperature range.

Operation of the module is deenergized from time to time either intentionally, for the convenience of the operator, or unintentionally, as when there is a lack of power. When operation of the module terminates and the cooling chamber begins to warm, thermal energy from the cooling chamber is transferred by conduction to the "cold sink" created in the gel when the module was in operation. This slows the warming process and extends the time the cooling chamber will remain in the desired temperature range.

The polymer gel has a volumetric heat capacity such that the gel is effective to convectively transfer thermal energy to the chamber as the chamber is cooled and effective to absorb thermal energy from the chamber as the chamber increases in temperature. The thermal energy absorbed by the gel is sufficient to maintain the temperature of the cooling chamber in the specified temperature range for a specified period of time when the module is deenergized. In an example applicable to many thermally sensitive medications, the volume of gel material in conductive heat transfer relationship with the cooling chamber is one having a thermal mass or volumetric heat capacity effective to maintain the cooling chamber and its anticipated contents at a temperature within the range of 2° C. to 8° C. for a period of five hours without active cooling by the module.

The method may further include the steps of conducting heat energy from the hot side of the thermoelectric heat transfer module by means of a heat sink and cooling the heat sink convectively by means of a fan.

BRIEF DESCRIPTION OF THE DRAWINGS

A preferred embodiment of the invention is described in connection with the accompanying drawings, in which.

DETAILED DESCRIPTION OF THE DRAWINGS

Figure 1:
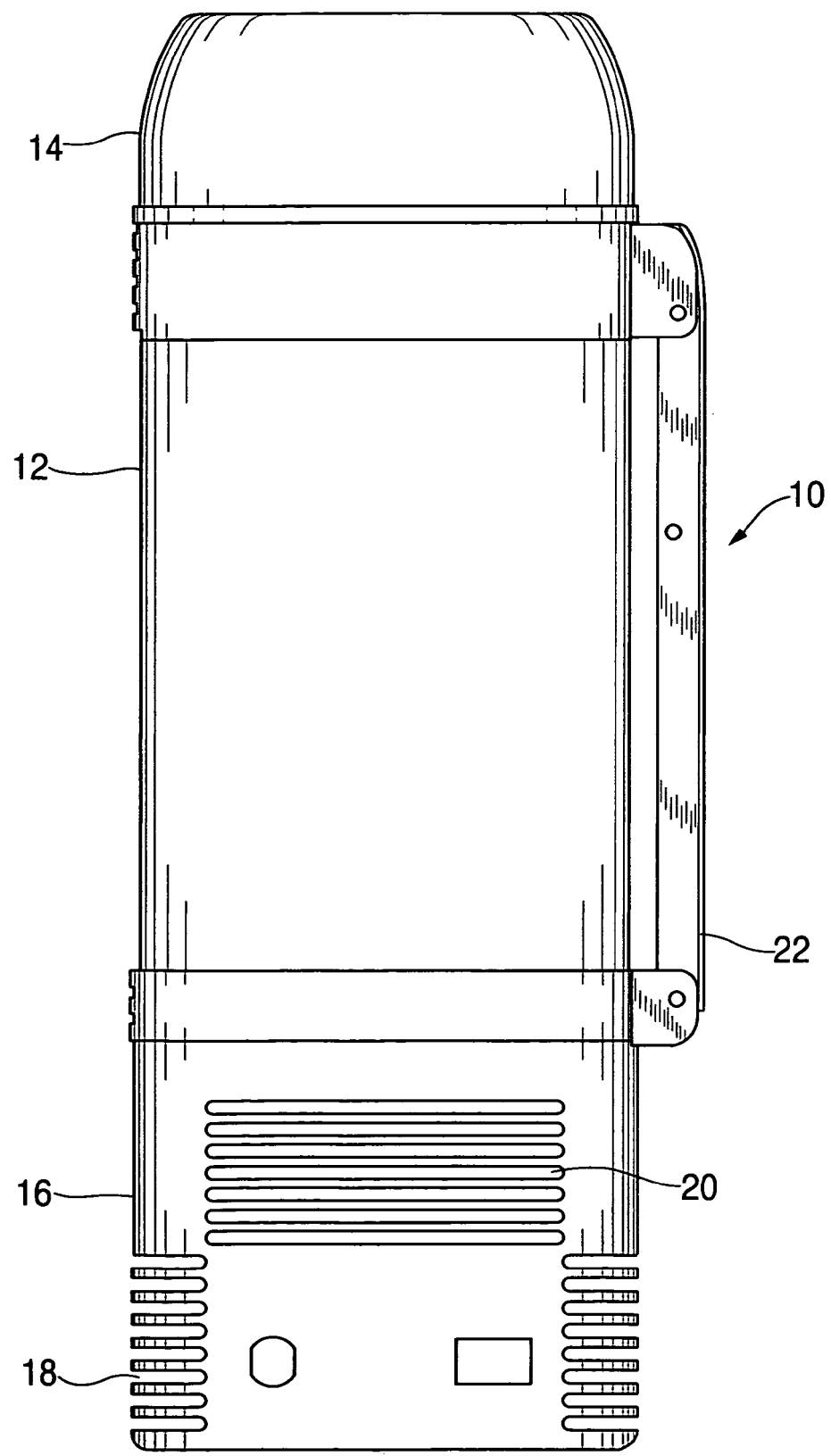
FIG. 1 is an external view of a cooler incorporating the present invention.

The refrigeration unit 10 is a portable thermoelectric cooler specifically designed to hold thermally sensitive items such as medicines, biological tissues and other perishables. The configuration shown is particularly adapted to hold several medipens each containing several doses of the medication and useable by a patient to administer measured doses one at a time. The unit utilizes a thermoelectric heat transfer module 46 employing the Peltier effect to cool an inner chamber (cold chamber) 24 where the thermally sensitive items are stored. The inner chamber 24 is surrounded on the sides by a sealed chamber 42 containing polymer gel 44. The gel creates a "volume of cold" that allows the unit to remain cool for a time after the power to the module 46 is shut off. The polymer gel chamber 42 is surrounded by another sealed chamber 40 that is in a vacuum. The vacuum chamber provides superior insulation.

The bottom 28 of the chamber 24 is flat. Two small screws (not shown) connect the cold chamber 24 to the cooling system 45 situated within the housing 16. A screw cap 32 for the chamber 24 is of sufficient thickness to provide insulating material 33 with an insulating value equal to that of the vacuum chamber 40. In the illustrated embodiment, the cold chamber 24 is 51 mm in diameter and 178 mm long, not counting the cap 32. Overall the unit 10 of FIG. 1 is 119 mm in diameter and 355 mm long.

Referring to FIG. 1, the cooling device or unit 10 incorporates an upper housing 12, a base housing 16 and an upper housing closure 14. The base housing 16 incorporates air inlet vents 18 and air outlet vents 20 for a fan contained in the base housing. The device is provided with a carrier 22. The base housing 16 is mounted to the upper housing 12 at the end opposite the closure 14.

Figure 2:
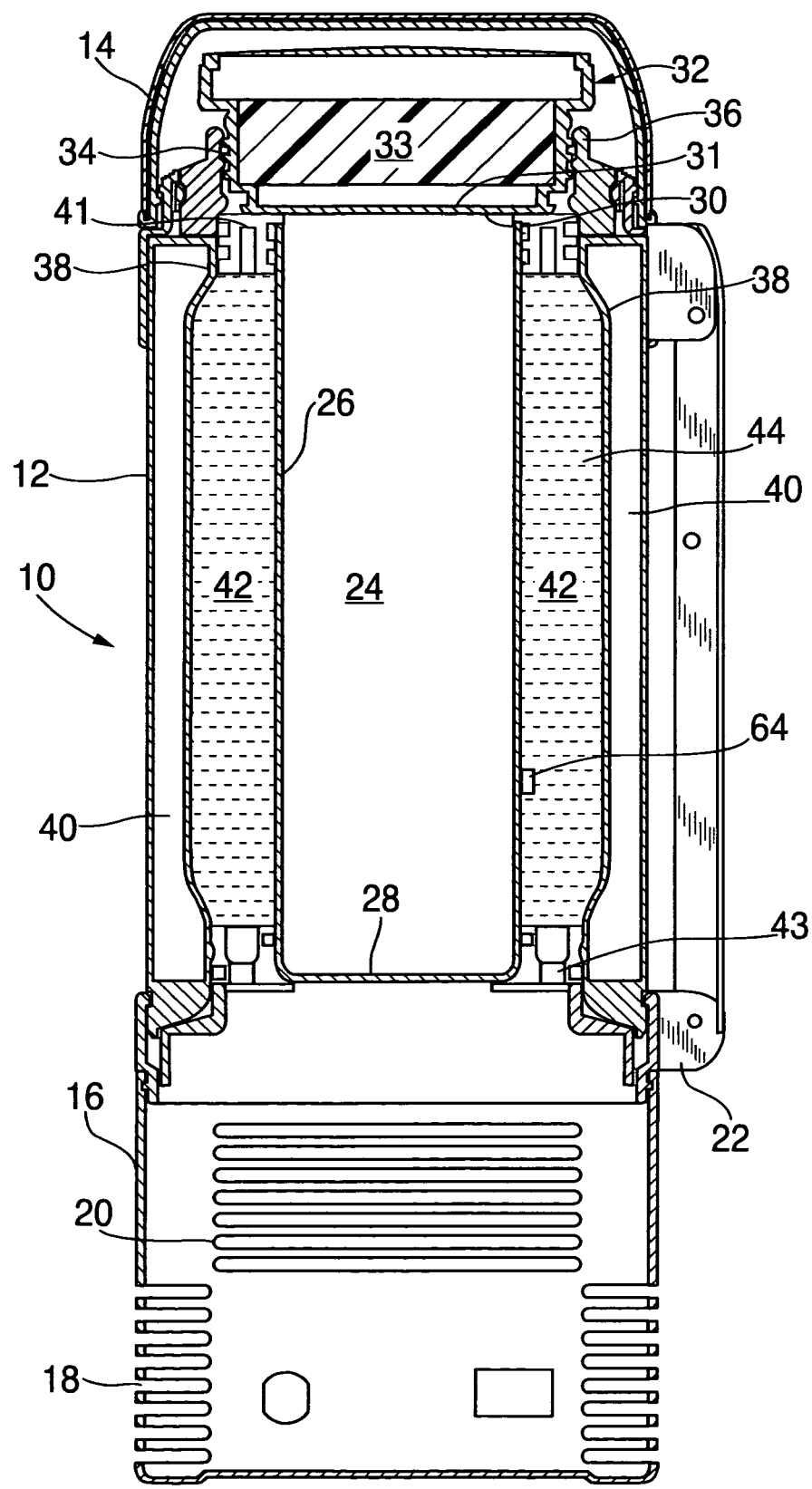
FIG. 2 is a longitudinal cross-sectional view of the device of FIG. 1.

FIG. 2 shows an elongated cooling chamber 24 (cylindrical or other polygonal configuration in cross-section) having side wall 26 and bottom 28 that can be of a metal such as aluminum to provide desired thermal conduction characteristics. Opposite the bottom 28 is an opening 30 for the chamber 24 through which thermally sensitive charges such as the medication dispensing pens are introduced and removed. The inner, removable closure or cap 32 is provided for closing the opening 30. Closure 32 is a screw-type having a flat inner surface 31 that engages the rim of opening 30 to close the opening and a threaded rim 34 that mates with threads 36 formed at one end of vacuum chamber housing 38. Vacuum chamber housing 38 is sealed and evacuated to form the insulating vacuum chamber 40. In this view the upper housing 12 is incorporated within and forms a part of the vacuum chamber housing 38. Between the vacuum chamber 40 and the cooling chamber 24 is a sealed chamber 42 filled with a super absorbent polymer gel 44, leaving room for the gel to expand and contract with temperature changes. Sealing elements 41 and 43 form seals for the sealed chamber 42. The gel 44 has a volumetric heat capacity effective to discharge or release thermal energy to the cooling chamber 24 when the cooling chamber is at temperatures below the temperature of the gel and absorb thermal energy from the chamber 24 when the chamber is at temperatures above the temperature of the gel 44. The gel 44 is selected from a group of materials characterized by volumetric heat capacities that yield the needed thermal energy absorbing and releasing characteristics, within the volume provided within the sealed chamber 42. An example of a super absorbent polymer gel used in the device 10 is one sourced from Shanghai Yishun Icepack Company; No. 6 Building, No. 1456 Xintanwa Road; Shanghai, China.

Figure 3:
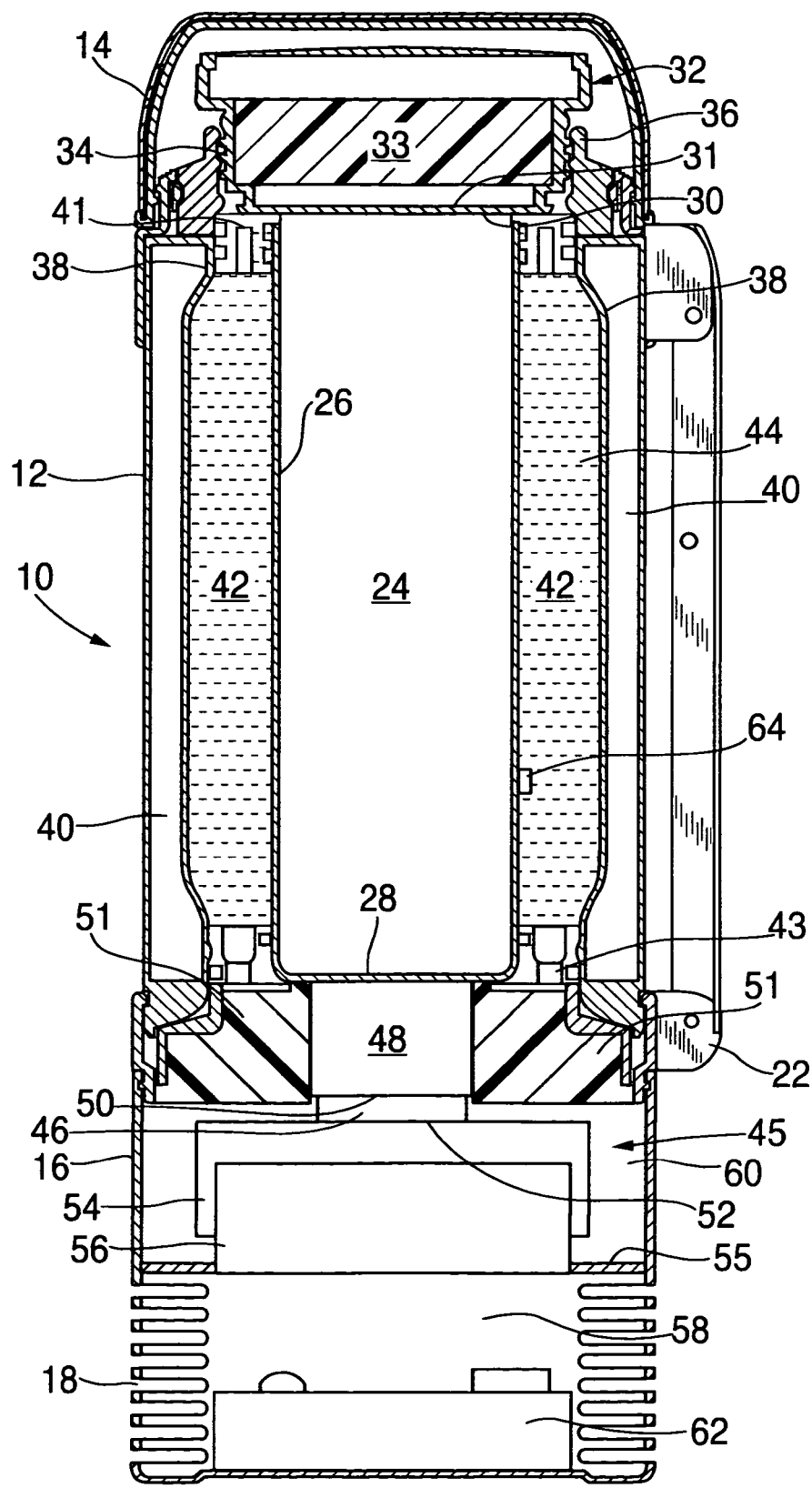
FIG. 3 is a more detailed longitudinal cross-sectional view of the device of FIG. 1 showing a preferred embodiment of the invention.

Referring to FIG. 3 a thermoelectric heat transfer module 46 (i.e.: a Peltier effect module) is in thermally conductive communication with the bottom 28 of the cooling chamber 24. The device described will use a single stage thermoelectric module, either 30 mm×30 mm or 40 mm×40 mm. Modules usable with this invention are available from a number of sources including Laird Technologies, a unit of Laird PLC, St. Louis, Mo., USA and Marlow Industries, Thermoelectric Modules Activity Group, Dallas Tex., USA. A series of thermoelectric modules useable with this invention is the Laird Technologies Ceramic Plate Series CP14, 127,045.

A thermal conductor 48 is interposed between the chamber bottom 28 and the cold side 50 of the module 46. The thermal conductor 48 provides space for thermal insulation 51 between the chamber bottom 28 and the module 46. The thermal conductor 48 may be an aluminum block in thermally conductive engagement with both the cold side 50 of the module 46 and the chamber bottom 28. Heat transfer may be enhanced by applying a thermal joint compound, such as a heat transfer enhancing material, at the thermally conductive interfaces at the ends of the conductor 48.

The hot side 52 of the module 46 engages and is in thermal energy transfer relationship with a heat sink 54. The heat sink 54 is located above ductwork 55 that channels air to and from a fan 56. The heat sink 54 and an associated fan 56 dissipate thermal energy (heat) that is removed from the cold chamber 24 by the module 46. Two small screws, not shown, run from the heat sink to the aluminum block, one on either side of the module 46 to hold the sandwich configuration and ensure good thermally transmissive contact between the module and the heat sink and the aluminum block. The block 48 is bolted to the cold chamber 24 with two screws (not shown). A thin layer of a thermal joint compound is also applied at the junction of the module hot side 52 and the heat sink 54 to aid thermal energy transfer. The thermally conductive block 48 has two primary functions. It creates space between the cold chamber 24 and the heat sink and module assembly to make room for insulation; it transfers energy out of the cold chamber 24 to the cold side 50 of the module 46. A layer of urethane thermal insulation 51 surrounds the block 48, in the space between the assembly and the bottom 28 to protect the cold chamber from thermal contamination by heat from the heat sink 54 and from ambient conditions.

The heat sink 54 conducts heat energy from the hot side 52 of the module 46 and away from the cooling chamber 24. A DC powered fan 56 draws air through plastic inlet duct 58 and vent 18 to cool the heat sink 54. Heated air from the heat sink flows through plastic outlet duct 60 and vent 20 to the ambient surroundings. The fan 56 may be mounted directly on the heat sink and recessed into it for maximum efficiency. The heat sink 54 is preferably finned along its side facing the air flow.

A printed circuit board with a small micro-processor 62 uses input from a resistance temperature detector 64 to control the amount of DC voltage delivered to the thermoelectric heat transfer module 46 and the fan 56. The microprocessor 62 is located within the base housing 16, below the structure that channels air to and from the fan 56. The detector 64 is placed on the metal shell or wall 26 that creates the cold chamber 24, at the interface of the wall 26 and the sealed gel chamber 42. In this location the temperature signal provided by the detector may be a function of the temperature of both the cold chamber 24 and the gel chamber 42. If desired the detector could be thermally shielded from one of the chambers so that it would be, or mainly would be, sensitive to the temperature in one chamber and not the other. The detector 64, the microprocessor 62 and the module 46 are in electrical communication with each other, as by an insulated wire connection.

The microprocessor 62 controls the module 46 via a variable voltage output programmed into the micro-processor at the time of assembly. The voltage output varies in response to temperature signals from the detector 64. The power supplied to the module 46 by the microprocessor 62 is only as much as is required to maintain proper temperature in the cold compartment 24. This facilitates extended use of a portable battery to power the unit when other power sources are not available.

In use, the cooling system 45 is energized and perishable, thermally sensitive material such as medication in vials or dispensing pens is placed in the cold chamber 24. The microprocessor 62 receives from the detector 64 a signal indicative of the temperature of the cold chamber. Typically the temperature will be near ambient, above the target temperature. The microprocessor 62 activates the thermoelectric heat transfer module 46 to operate with the heat absorbing cold side 50 in thermal communication with the bottom 28 of the cold chamber 24 and the heat emissive hot side 52 in thermal communication with the heat sink 54. The module 46 cools the cold chamber 24 to the target temperature. Because the polymer gel 44 in the sealed chamber 42 is in thermally conductive communication with the cold chamber 24, the gel 44 is cooled by conduction as the chamber 24 is cooled. In one configuration the cooling chamber may reach target temperature in about ten minutes and it may take two to three hours for the entire volume of gel to reach target temperature. Thermal insulation 40 and 51 minimizes thermal loss to the ambient surroundings. The detector 64 and the microprocessor 62 operate thermostatically to maintain the desired temperature in the cold chamber 24 and the polymer gel 44. The microprocessor 62 operates the fan 56 to cool the heat sink 54 and draw away heat energy extracted from the cold chamber and the polymer gel. The fan may be operated in unison with the module in response to signals from the above mentioned detector 64 or a second sensor, not shown, may be located on the heat sink 54 for providing to the microprocessor a second signal that is indicative of the temperature of the heat sink. The microprocessor can then be programmed to control the fan in response to heat sink temperature.

When the cold chamber 24 is being cooled by the thermoelectric heat transfer module 46 heat transfer occurs from the polymer gel 44 in the gel chamber 42 to the cold chamber 24 and from the cold chamber 24, along the conductor 48 to the heat sink 54. Preferably, this continues until substantially the same temperature, the target temperature, is reached in both the cold chamber 24 and the polymer gel 44. Ideally the chamber and the gel attain thermal equilibrium. The cold chamber 24 and the gel 44 are maintained at the target temperature by the thermoelectric heat transfer module 46 as long as it operates. When the thermoelectric heat transfer module 46 ceases to operate the heat transfer reverses. Thermal energy from ambient surroundings as well as some of the residual thermal energy in the heat sink 54 tends to transfer to the cold chamber 24 and warm it. When this condition prevails, thermal energy from the cold chamber 24 is transferred to the relatively cooler material 44 in the sealed chamber 42. That is, thermal energy from the "warming" cold chamber 24 transfers to the "cooler" material 44 so the time interval during which the cold chamber remains within the target temperature range is extended.

The present invention is described in terms of specific preferred embodiments. It is intended that the claims be read as covering alterations and other uses that may be made by those skilled in the art which are within the true scope of the invention.

What is claimed is:

1. A cooler comprising:
   a cooling chamber having a wall surface and a bottom surface;
   a polymer gel characterized by a thermal mass effective to extend the period of time in which the temperature of said cooling chamber is maintained within a target range without active cooling;
   means for confining said polymer gel in heat transfer relationship with said cooling chamber and separating said polymer gel from the storage space of said cooling chamber;
   means for insulating said polymer gel and said cooling chamber from ambient conditions;
   a thermoelectric heat transfer module having a heat absorbing cold side and an opposing heat emissive hot side;
   a thermal conductor situated between and in thermally conductive communication with said bottom surface and the cold side of said module whereby the cold side of said module thermally communicates with said bottom surface to cool said cooling chamber and said polymer gel when said module is energized, said thermal conductor defining a space between said bottom surface and the cold side of said module;
   thermal insulation surrounding said conductor the space defined by said thermal conductor between said bottom surface and the cold side of said module;
   a heat sink in thermally conductive communication with the hot side of said module; and
   a fan for cooling said heat sink.

2. The cooler according to claim 1 further comprising;
   a detector for providing a signal indicative of the temperature of said cooling chamber; and
   a micro-processor responsive to output from said detector for controlling operation of said thermoelectric heat transfer module and said fan.

3. The cooler according to claim 2 further comprising:
   means forming air passages for directing ambient air to said fan and from said fan to said heat sink; and means forming one or more passages for directing heated air from said heat sink.

4. The cooler according to claim 1 wherein said cooling chamber comprises a wall surface polygonal in cross-section and a planar bottom surface.

5. The cooler according to claim 1 wherein said thermal conductor comprises an aluminum block thermally engaging the bottom surface of said cooling chamber and defining a planar surface opposite the bottom surface of said cooling chamber thermally engaging the cold side of said module.

* * * * *